July 1, 1924.                                1,499,598
W. SCHMIDT
DEVICE FOR DISCHARGING COMBUSTION GASES FROM SUBMARINES
Filed Sept. 27, 1922        2 Sheets-Sheet 1
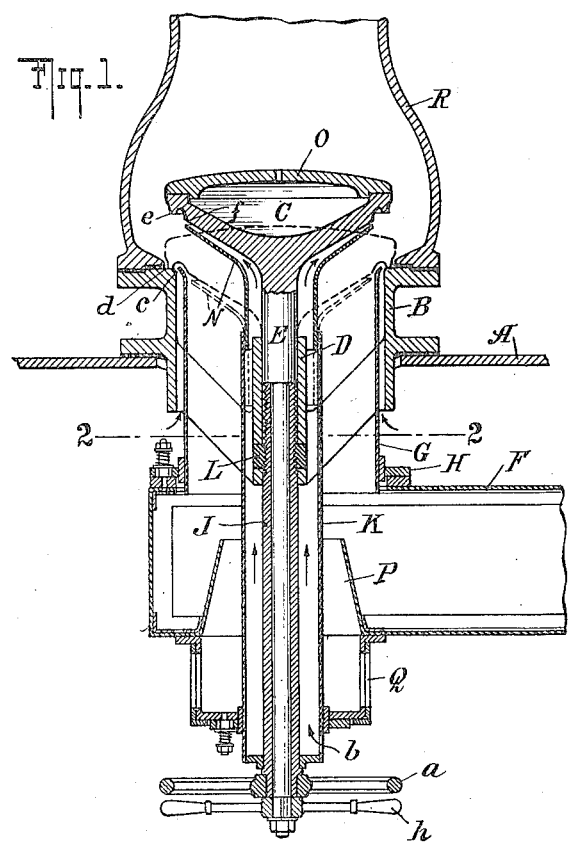
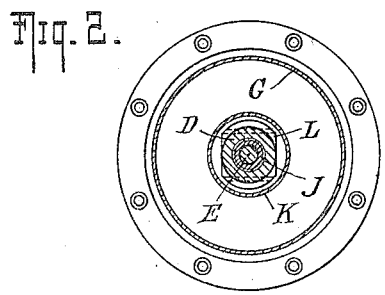
WITNESS
G. V. Rasmussen
INVENTOR
WILHELM SCHMIDT
BY
ATTORNEYS

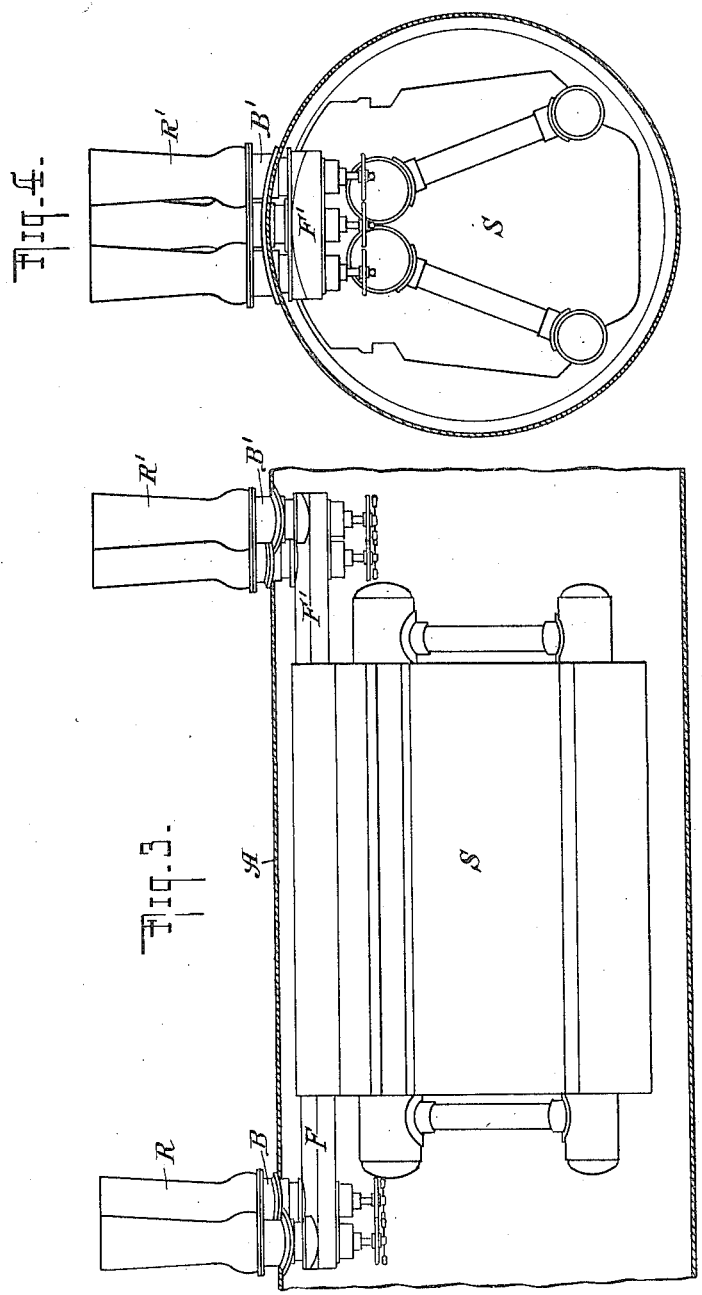

Patented July 1, 1924.

1,499,598

UNITED STATES PATENT OFFICE.

WILHELM SCHMIDT, OF CASSEL-WILHELMSHOHE, GERMANY.

DEVICE FOR DISCHARGING COMBUSTION GASES FROM SUBMARINES.

Application filed September 27, 1922. Serial No. 590,812.

*To all whom it may concern:*

Be it known that I, WILHELM SCHMIDT, a citizen of the Republic of Germany, and a resident of Cassel-Wilhelmshohe, Germany, have invented certain new and useful Improvements in Devices for Discharging Combustion Gases from Submarines, of which the following is a specification.

For surface traveling, submarines have generally been operated by means of internal combustion engines or steam engines, the hot combustion products being discharged into the atmosphere. Of course, when traveling submerged, the submarines are operated by other power than that derived from the engines mentioned above, and the conduits through which the combustion gases are discharged during surface traveling are closed. Considerable difficulties have arisen in connection with the valves employed for closing such discharge conduits during the submerged traveling, since these devices are very liable to leak. This is the case particularly when high power is employed for surface traveling and when, therefore, the volume of combustion products to be discharged is comparatively large. The danger of leakage arises partly from the fact that the seats of the shut-off devices are readily soiled by soot or other residues of combustion, so that they will become pitted, and partly from the fact that these shut-off devices are made of relatively large dimensions and will be subject to warping owing to the great pressure of water resting thereon and to the strong heating and sudden cooling.

These difficulties involve the unpleasant consequence of lengthening, in a very undesirable manner, the time required for diving since, in order to close these shut-off devices tightly, it is almost always necessary to clean or even to regrind the seating surfaces.

The invention described hereinafter has for its object to avoid the drawbacks just explained.

For this purpose, the seating surfaces of the shut-off devices controlling the discharge of the combustion gases are protected against contact with such gases by currents of pure air or other suitable gaseous medium forming a blanket or screen. This protective stream of air or gas forming a screen must be of a certain strength in order that it may not be deflected and disrupted by the current of combustion gases, but may keep the combustion gas particles and the impurities contained therein away from the seating surfaces by a blowing action. When these conditions are fulfilled, all soiling of the seating surfaces is effectively prevented, so that upon diving, and during submerged travel, the shut-off devices may be closed promptly and kept tight permanently.

My invention may be utilized in a very simple manner for the discharge of combustion gases from steam boiler plants in which the space containing the boiler is under the pressure of compressed air. The major portion of the compressed air is supplied to the boiler furnace as air to support combustion. The other portion is used cold for the formation of the protective screen for the seating surfaces of the shut-off devices controlling the discharge of the combustion gases. Owing to the resistance to be overcome in the boiler flues, the combustion gases from the boiler furnace have a lower pressure and a lower velocity in the stack of the boiler plant than the pure compressed air which is taken directly from the stoke room as a protective medium for the seating surfaces; thus, the formation of an air screen is insured in every case.

By an appropriate arrangement of the streams of air or gas serving to protect the seating surfaces the energy of such streams may be further utilized by causing them to exert suction on the combustion gases. In this manner I may, for instance, feed the air to support combustion in a boiler plant provided with such an arrangement or at least the draft may be increased. The cold air supplied will, in this case, also exert a cooling action on the parts along which it passes.

The invention may be carried further, for instance, by providing below the discharge devices nozzles supplied with compressed air. The jets of air issuing from the said nozzles will exert a suction effect on the combustion gases and will thus permit the speed at which such gases are discharged to be increased, which means that the cross-section of the combustion gas discharge may be reduced, and this is very desirable since, at the same time, it diminishes the difficulties of obtaining tight joints. The said air jets are further of advantage in that they mix with the hot combustion gases of the furnace and thus reduce their temperature.

It is also of particular simplicity to employ such an arrangement in connection with boiler plants in which the stoke room is under pressure. The boiler plant provided with this device will then operate with a double draft, that is to say, a forced draft from below, since a portion of the air for supporting combustion is fed to the furnace under pressure, and also a simultaneous induced draft, since the other portion of the compressed air issues from the nozzles and acts as a suction medium to increase the boiler draft. The air pressure produced by the blowers feeding the air can therefore, in this case, be materially lower than when the boiler furnace is operated only with a draft from below. Another advantage of such arrangement is that the openings for the discharge of the combustion gases are further reduced, thereby establishing very favorable conditions for a tight seating of the shut-off devices.

It is preferable to construct the shut-off devices as single seat valves arranged to be operated from the interior of the boat. The seats of these valves are, according to this invention, protected by annular screens of moving air or other suitable gaseous medium. Preferably, for this purpose, the valve casings, the valve spindles and the valve bodies are provided in the discharge passages for the combustion gases with jackets forming annular chambers through which the protective streams of air or gas are conveyed to the seating surfaces. If the annular spaces are made to terminate adjacent to the seating surfaces with annular slots having a discharge direction substantially parallel to the seating surfaces. this will insure a perfect protection of the seating surfaces by the screens thus formed and the reliable keeping away of any impurities from such seating surfaces. Furthermore, these cone-shaped currents of air will exert a suction effect on the combustion gases discharged and will thus increase the speed of their discharge.

By causing the current of cold air to pass along the main portions of the shut-off devices, the latter are cooled thoroughly. I thus avoid effectively warping which might be caused by expansion upon an increase of temperature and which might easily produce leakage at the seats and which might also cause unpleasant effects upon the hull of the boat at the points where it is provided with openings for the discharge of the combustion gases owing to the sudden cooling resulting from the diving of the boat.

For the sake of increased safety, the jackets through which air is conveyed and the upper surface of the valve body may be provided with insulating material to protect them from the influence of the hot combustion products, so that the heating of the shut-off devices will be hardly appreciable.

In all cases in which the present invention is used for discharging combustion gases from steam boiler furnaces, it is preferable to connect the shut-off devices with smoke flues projecting beyond the boilers. This arrangement renders such devices readily accessible from the interior of the boat and the shut-off devices may therefore be operated readily. Furthermore, if the stoke room is under pressure, the supply of the current of air serving as a protecting medium for the seats will be simplified considerably, since special air conduits and shut-off devices will not be required for this purpose.

It is preferable to provide for each steam boiler several independent discharge openings for the combustion gases with means for shutting them off, for the employment of a plurality of such devices facilitates the securing of tight joints, since this result is more readily obtained with small diameters than with large ones. The subdivision of the discharge opening for the combustion gases into several openings is of particular value when suction nozzles are employed for mixing cold air with the hot combustion gases for the purpose of reducing the temperature of said gases and for producing or increasing the boiler draft. If a single large discharge opening were employed for the hot combustion gases, this would not afford perfect utilization of the energy of the air current or such a satisfactory mixture with the combustion gases. Furthermore, in that case, the height of the construction would be increased for the reason that a certain distance between the nozzles and the discharge flue, depending on the diameter, is required for the efficient operation of an injector draft device; such a height, however, is but seldom available on submarines, if at all, on account of the very restricted space.

Without desiring to restrict myself to the particular details illustrated. I will now describe an example of my invention with reference to the accompanying drawings, in which Figure 1 is a vertical section illustrating a discharge device embodying my invention and intended for use in connection with a boiler plant, the stoke room of which is under pressure; Fig. 2 is a horizontal section on the line 2—2 of Fig. 1; Fig. 3 is a side elevation showing two devices of the character illustrated by Figs. 1 and 2 in connection with the boiler of a submarine, and Fig. 4 is a corresponding cross-section.

Referring particularly to Figs. 1 and 2, A indicates a portion of the body or hull of the submarine with an opening in which is set the valve casing B and the valve spindle guide D rigidly connected with said casing. In said guide is mounted to slide and to turn the spindle E of the valve, the body of which is indicated at C. In Fig. 1 dotted lines indicate the closed or seated position of the valve and full lines its open position. A jacket G prevents contact of the combustion gases with the valve casing B and thus protects the latter; this jacket is movably connected with the smoke flue F of a boiler by means of a movable ring H, so that the valve casing will not be affected by boiler movements caused by expansion and contraction owing to temperature changes. Similarly, jackets K and N are provided for the guide D and the spindle E respectively. The spindle E has a portion surrounded by a sleeve J which may be turned by means of a hand-wheel $a$ and which is provided at its upper portion with an external screw-thread fitting it to a stationary nut L, so that upon turning the hand-wheel $a$, the sleeve J may be raised to give a similar motion to the spindle E and to the valve body C. As soon as the stoke room is under pressure then, upon opening the valve, compressed air will pass through the annular chamber formed between the jacket G and the valve casing B and will also pass through openings $b$ into the jacket K. Two currents of air will thus be formed, one of which will issue at the annular slit $c$ and will sweep in the shape of a strong jet-like stream over the seating surfaces $d$ of the valve casing. Another current of air will pass from the interior of the jacket K between the funnel-like extension N thereof and the valve body C to issue in a jet-like annular screen at the annular slit $f$ substantially parallel with and directed towards the seating surface $e$ of said valve body C. If the valve body is furthermore provided with an insulating cover O which may, for instance, consist of porcelain, a perfect safeguard is obtained against any distortion of the shut-off device due to temperature changes and impairing the tightness of the joint. For the sake of greater safety the jackets K, N and G may likewise be lined with insulating material, so that even with very high temperatures of the combustion gases the shut-off devices may remain relatively cool.

At the outer end of the valve spindle E I have shown a lever $h$ for turning the valve body C when desired.

For the purpose of increasing the draft I may, as shown in Fig. 1, provide an annular nozzle P receiving a supply of compressed air through openings, the size of which may be regulated by an annular valve Q of well known construction. I thus obtain a mixture of the hot combustion gases with cold, compressed air and thus further reduce the temperature in the shut-off valve, thereby increasing the draft and also the reliability of operation. The discharge pipe R for the combustion gases is preferably separated from the cooled valve casing B by an interposed insulating body in order to prevent the transmission of heat.

In Figs. 3 and 4 I have indicated one way of applying a device of the character shown in Figs. 1 and 2 to a submarine boiler. The boiler S has two smoke flues F—F' projecting from it at opposite sides and with each of said flues are connected three valve casings B—B' respectively, with their discharge pipes R—R' respectively it being understood that the interior construction of these devices is the same as illustrated by Figs. 1 and 2. The opening and closing of all the valves may be readily effected from the inside of the boat.

While Figs. 3 and 4 show a separate discharge flue R—R' for each of the valve or shut-off devices, the discharge flues could be combined and instead of being directed vertically, as shown, they might be disposed horizontally and terminate at the stern of the boat.

While my invention is designed particularly for use in conjunction with submarines, it will be obvious that certain features of the apparatus described might be used in other connections where it is desired to insure the cleanliness and proper fit of valve surfaces.

Various modifications may be made within the scope of the claims without departing from the nature of my invention.

I claim:

1. In combination with a passage for the discharge of hot gases, and particularly the combustion gases of power plants for the operation of submarines, and with a shut-off device adapted to control said passage, and a seat for said device, a protective device for throwing a screen of a gaseous medium between the meeting surfaces of said shut-off device and of its seat, so as to protect said surfaces against contact with the hot gases.

2. In combination with a steam power plant, (particularly for submarines), the boiler furnace of which is operated with air pressure in the stoke room, a passage for the discharge of the hot combustion products from said plant, a shut-off device adapted to control said passage, a seat for said device, and means for directing a portion of the compressed air supplied to the stoke room as a screen between the meeting surfaces of said shut-off device and of its seat, so as to protect said surfaces against contact with the hot combustion products.

3. In combination with a steam power plant, (particularly for submarines), equipped with a boiler, a passage projecting from said boiler for the discharge of the hot combustion products from said plant, a shut-off device adapted to control said passage, a seat for said device, and means for throwing a screen of a gaseous medium between the meeting surfaces of said shut-off device and of its seat, so as to protect said surfaces against contact with the hot combustion products.

4. In combination with a steam power plant, (particularly for submarines), equipped with a boiler, a plurality of passages leading from said boiler for the discharge of the hot combustion products, separate shut-off devices for controlling the individual passages, a seat for each of said devices, and means for throwing a screen of a gaseous medium between the meeting surfaces of each of said shut-off devices and of its seat, so as to protect said surfaces against contact with the hot combustion products.

5. In combination with a power plant, (particularly for submarines), of a type discharging hot combustion products, a plurality of passages for the discharge of such hot combustion products, separate shut-off devices for controlling the individual passages, a seat for each of said devices, and means for throwing a screen of a gaseous medium between the meeting surfaces of each of said shut-off devices and of its seat, so as to protect said surfaces against contact with the hot combustion products.

6. In combination, a passage for the discharge of hot gases, and particularly the combustion of gases of power plants for the operation of submarines, a shut-off device adapted to control said passage, a seat for said device, means for directing a screen of a gaseous medium between the meeting surfaces of said device and of its seat, so as to protect said surfaces against contact with the hot gases, and a nozzle for injecting compressed air, located in said passage, on the inlet side of the said shut-off device.

7. In combination, a passage for the discharge of hot gases, and particularly the combustion gases of power plants for the operation of submarines, a valve casing connected with said passage, a valve body having a seating surface, a seat having a surface to meet said seating surface of the valve body and to control said passage, a spindle connected with said valve body, and jackets associated with said valve casing, valve body and spindle and terminating in annular slits adjacent to the meeting surfaces to direct protecting gaseous streams adjacent to said surfaces.

8. In combination, a passage for the discharge of a fluid, a valve controlling said passage, and a conduit, carried by said valve, for discharging a protective fluid adjacent to the seating surface of the valve.

9. In combination, a passage for the discharge of a fluid, a valve seat associated with said passage, a valve co-operating with said seat to control said passage, and a conduit, associated with said valve seat, and having an annular outlet for discharging a protective fluid adjacent to and directly towards the surface of said seat adapted to be engaged by the valve.

10. In combination, a passage for the discharge of a fluid, a valve casing surrounding a portion of said passage and forming with such portion an annular conduit for the supply of a protective fluid, said conduit having an annular outlet, said casing having a seat adjacent to the annular outlet of said conduit, and a valve controlling said passage and adapted to engage said seat.

11. In combination, a passage for the discharge of a fluid, a valve casing surrounding a portion of said passage and forming with such portion an annular conduit for the supply of a protective fluid, said casing having a seat adjacent to the outlet of said conduit, and a valve controlling said passage and adapted to engage said seat, said valve carrying a jacket for the supply of a protective fluid, the outlet of said jacket being adjacent to the seat-engaging portion of said valve.

12. In combination, a passage for the discharge of a fluid, a valve casing surrounding a portion of said passage and forming with such portion an annular conduit for the supply of a protective fluid, said casing having a seat adjacent to the outlet of said conduit, a valve body controlling said passage and adapted to engage said seat, a spindle connected with said valve body, a jacket surrounding said spindle and having an inlet for the supply of a protective fluid, another jacket carried by said valve body and associated with said spindle jacket to receive the protective fluid therefrom, said valve body jacket having a flaring portion with an outlet adjacent to the seat-engaging portion of said valve body.

In testimony whereof I have hereunto set my hand.

WILHELM SCHMIDT.